(12) United States Patent
Hilbert

(10) Patent No.: US 6,411,447 B1
(45) Date of Patent: Jun. 25, 2002

(54) GIMBALLED MIRROR ASSEMBLY

(75) Inventor: Andrea A. Hilbert, Mechanicsville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/852,465

(22) Filed: May 10, 2001

(51) Int. Cl.[7] .............................. G02B 7/02; G02B 7/182
(52) U.S. Cl. ..................... 359/822; 359/819; 359/876
(58) Field of Search .............................. 359/822, 823, 359/819, 813, 876, 872; 248/477, 479, 481, 487

(56) References Cited

U.S. PATENT DOCUMENTS

| | | | | |
|---|---|---|---|---|
| 3,761,163 A | * | 9/1973 | Chapman | 359/556 |
| 4,925,288 A | * | 5/1990 | Harris | 359/876 |
| 5,502,598 A | * | 3/1996 | Kimura et al. | 359/811 |
| 5,737,132 A | * | 4/1998 | Luecke et al. | 359/819 |
| 6,304,393 B1 | * | 10/2001 | Sechrist et al. | 359/822 |
| 6,327,065 B1 | * | 12/2001 | Danial et al. | 359/198 |

* cited by examiner

*Primary Examiner*—Georgia Epps
*Assistant Examiner*—Saeed Seyrafi
(74) *Attorney, Agent, or Firm*—Ron Billi

(57) ABSTRACT

A gimballed mirror assembly having an inner gimbal unit which carries a reflective mirror, an outer gimbal unit and a housing. The inner gimbal unit rotates within the outer gimbal unit, about a vertical axis. The top and bottom of the inner gimbal unit include conical depressions in which are located ball bearings to allow azimuth rotation. The outer gimbal unit rotates within the housing, about a horizontal axis. The sides of the outer gimbal unit include conical depressions in which are located ball bearings to allow elevation rotation. A first adjusting screw assembly contacts conical depressions in the back of the inner gimbal unit on opposite sides of the vertical axis to maintain the inner gimbal unit in a predetermined fixed orientation. A second adjusting screw assembly contacts conical depressions in the back of the outer gimbal unit on opposite sides of the horizontal axis to maintain the outer gimbal unit in a predetermined fixed orientation.

11 Claims, 7 Drawing Sheets

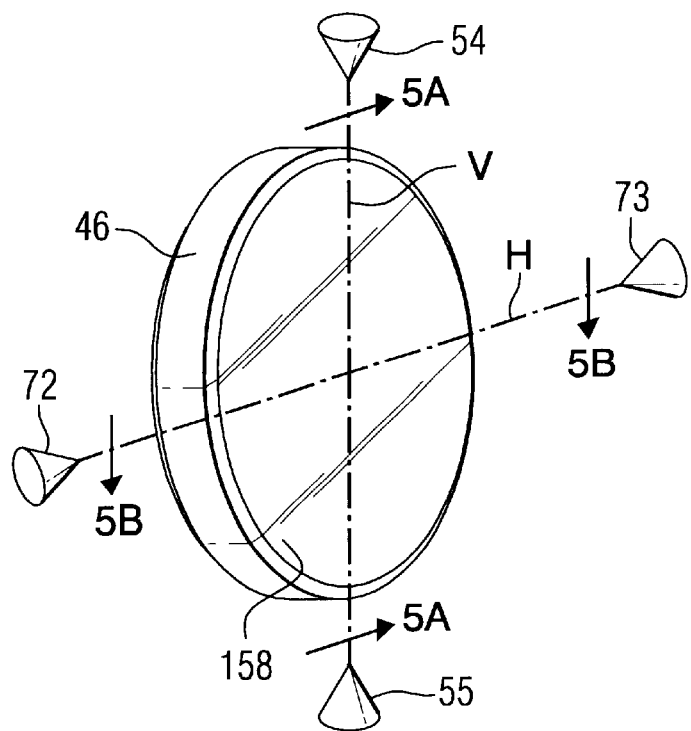
FIG. 5
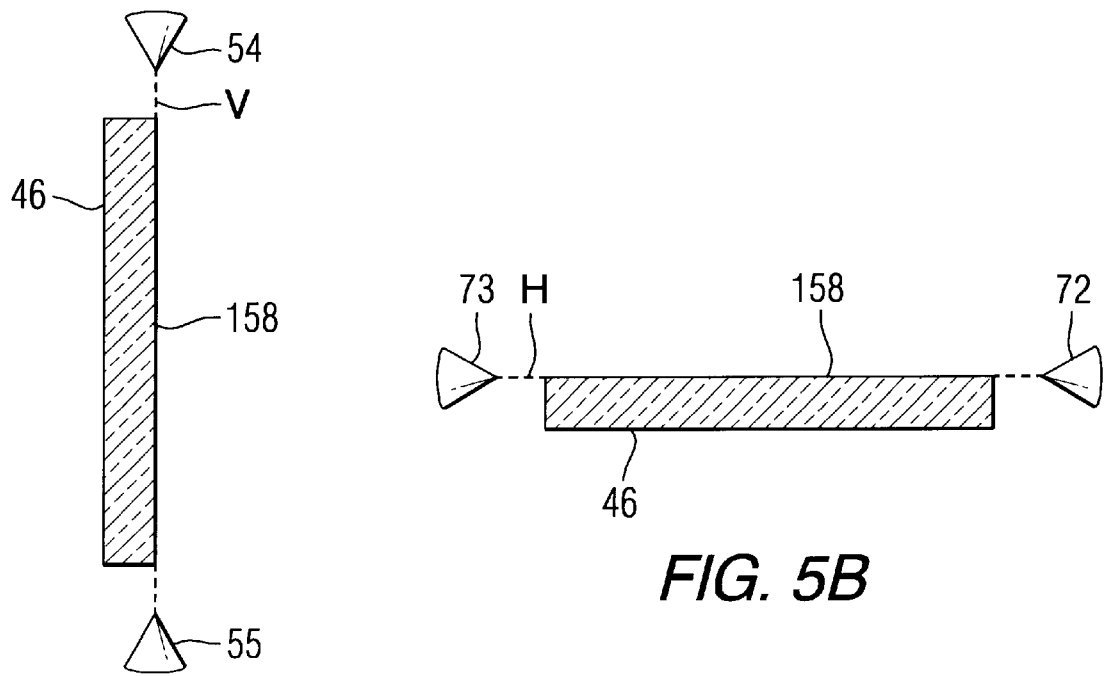
FIG. 5B
FIG. 5A

GIMBALLED MIRROR ASSEMBLY

STATEMENT OF GOVERNMENT INTEREST

The invention described herein may be manufactured and used by or for the Government of the United States of America for government purposes without the payment of any royalties therefor.

BACKGROUND OF THE INVENTION

Various optical systems require a reflective mirror for changing the direction of a beam of visible or invisible electromagnetic radiation. In order to accomplish this task, the mirror must be rotatable about two mutually perpendicular axes. Such a function may be provided by a gimballed mirror assembly.

By way of example, one use for the present invention is the field of laser radar (LADAR) systems wherein, due to space restraints, a generated laser beam is reflected off of mirrors to emerge at an exit port. A return beam is also changed in direction to impinge upon a receiver system. In such an environment the gimballed mirror assembly must be lightweight and must perform in the presence of extreme vibration.

Some typical gimballed mirror assemblies utilize bulky and heavy components and require springs to apply pressure on adjusting mechanisms. Although satisfactory for laboratory use, this method of providing positive contact permits vibratory responses to enter the assembly thereby rendering it essentially inoperative for use in aircraft.

The present invention obviates the drawbacks of present day gimballed mirror assemblies by providing a gimballed mirror assembly which is not only lightweight, but also which eliminates the requirement for any adjusting springs.

SUMMARY OF THE INVENTION

A gimballed mirror assembly in accordance with the present invention includes a housing with an outer gimbal unit positioned within the housing. A pair of ball bearings respectively positioned on opposite sides of the outer gimbal unit between the housing and the outer gimbal unit permits rotation of the outer gimbal unit about an axis passing through the ball bearings. An inner gimbal unit is positioned within the outer gimbal unit and another pair of ball bearings respectively positioned on the top and bottom of the inner gimbal unit between the outer gimbal unit and the inner gimbal unit permits rotation of the inner gimbal unit about an axis passing through the other pair of ball bearings. Preferably the ball bearings seat in conical depressions formed in the various components.

A first pair of adjusting screw assemblies are mounted to contact and position the inner gimbal unit and to maintain it in a selected position, and a second pair of adjusting screw assemblies are mounted to contact and position the outer gimbal unit and to maintain it in its selected position. Completing the assembly is a mirror having a reflective surface and carried by the inner gimbal unit.

BRIEF DESCRIPTION OF THE DRAWINGS

The invention will be better understood, and further objects, features and advantages thereof will become more apparent from the following description of the preferred embodiments, taken in conjunction with the accompanying drawings, in which:

FIG. 5 illustrates the relationship of the mirror with its axes of rotation.

FIG. 5A is a view along the line 5A—5A of FIG. 5.

FIG. 5B is a view along the line 5B—5B of FIG. 5.

DETAILED DESCRIPTION OF THE PREFERRED EMBODIMENTS

Figure 1A:
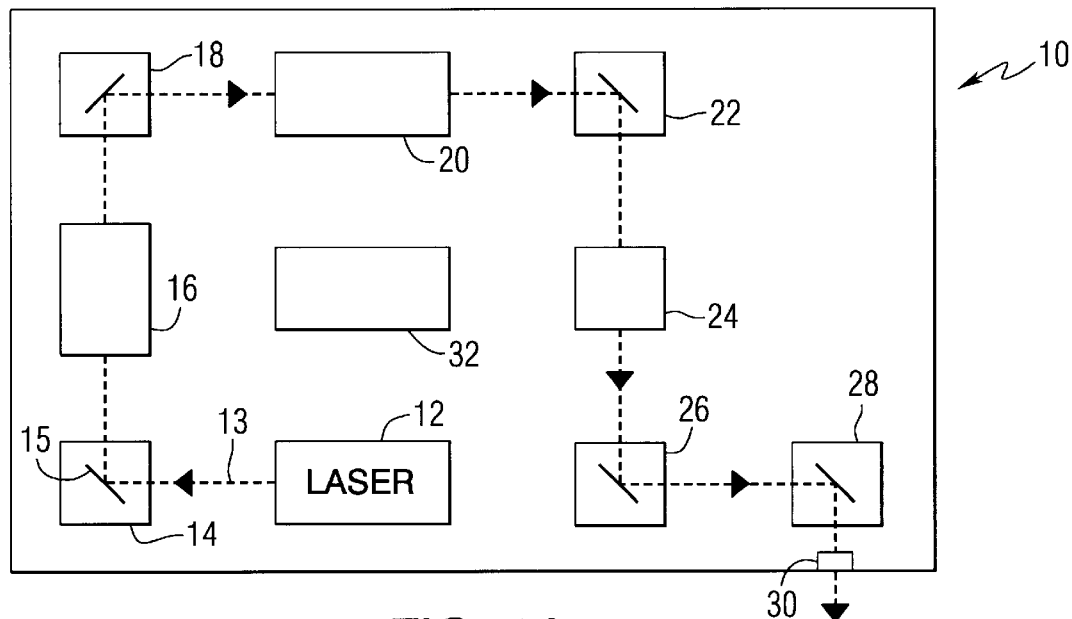
FIGS. 1A and 1B are block diagrams of one use for the gimballed mirror assembly of the present invention.

In the drawings, which are not necessarily to scale, like or corresponding parts are denoted by like or corresponding reference numerals. In addition, terms such as top, bottom, front, back, etc. are used herein for ease of explanation and not as structural or orientation limitations.

FIG. 1 is a simplified representation of a LADAR system 10. A laser unit 12 is operable to generate a beam 13 of electromagnetic energy of a certain wavelength. The beam 13 impinges upon a corner turner in the form of a gimballed mirror assembly 14 having a mirror 15 which is of a material to reflect the wavelength of beam 13. The redirected beam passes through an optics unit 16 and is again redirected by gimballed mirror assembly 18. After passing through optics unit 20, the beam is again redirected by gimballed mirror assembly 22 through optics unit 24, which internally includes a beam splitter. After two reflections from gimballed mirror assemblies 26 and 28, the beam exits through port 30.

Figure 1B:
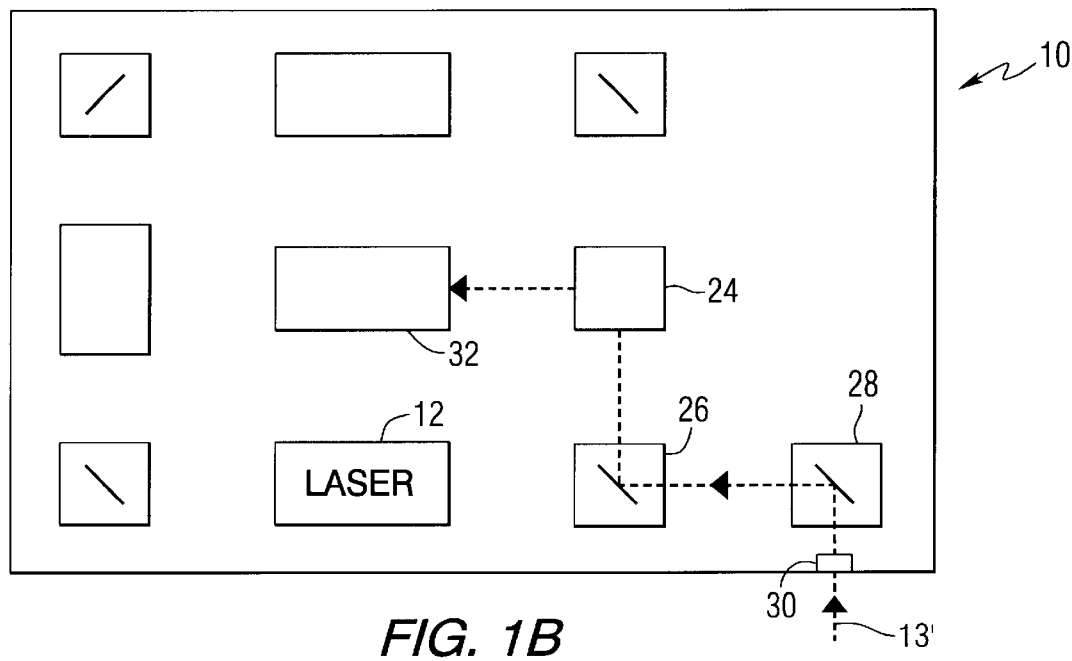

As seen in FIG. 1B, the return beam 13' is directed to detector system 32 by means of gimballed mirror assemblies 26 and 28 and optics unit 24. A visual display of a target may then be accomplished by processing in the detector system.

Figure 2:
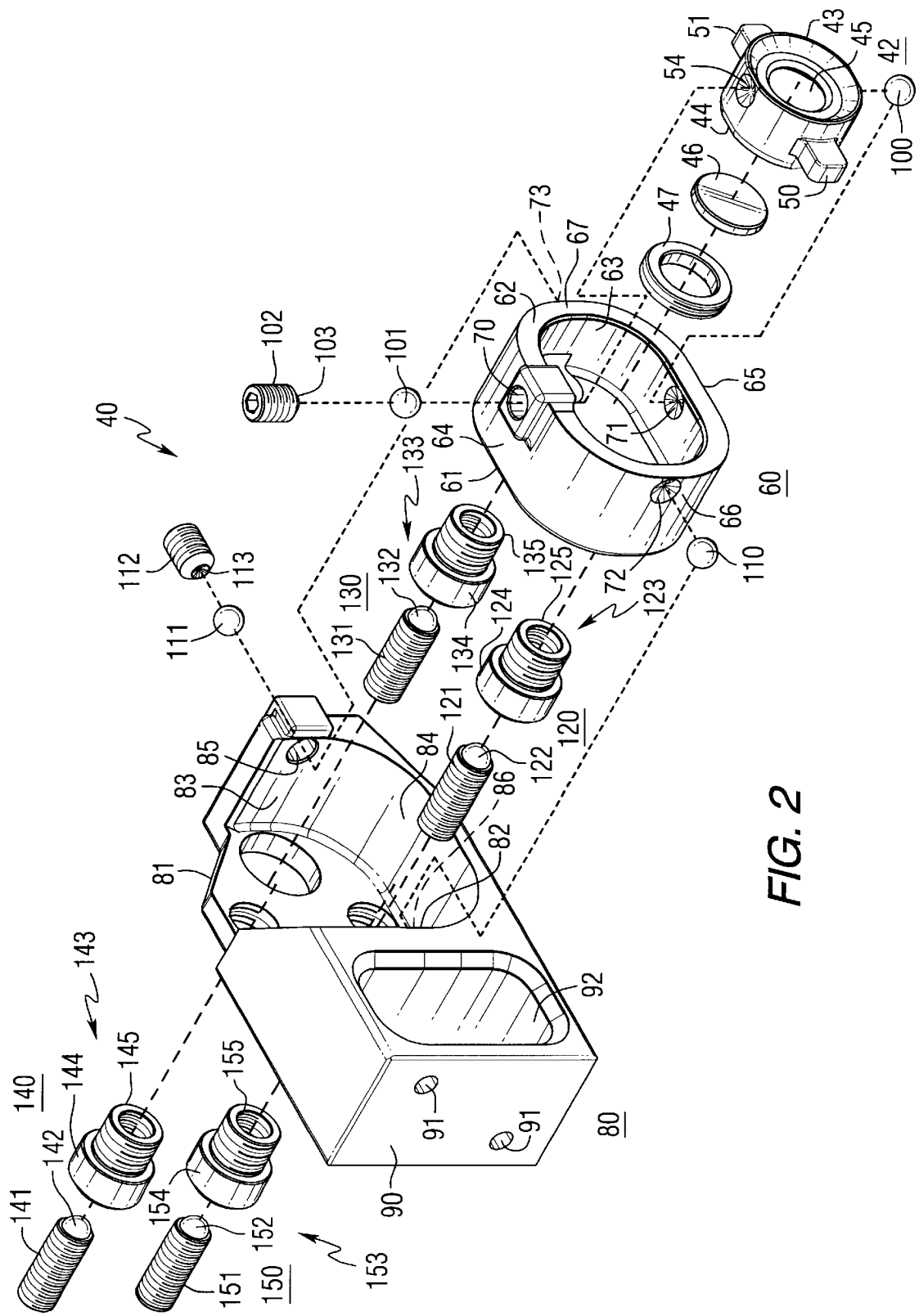
FIG. 2 is an exploded view of one embodiment of the present invention.
Figure 3:
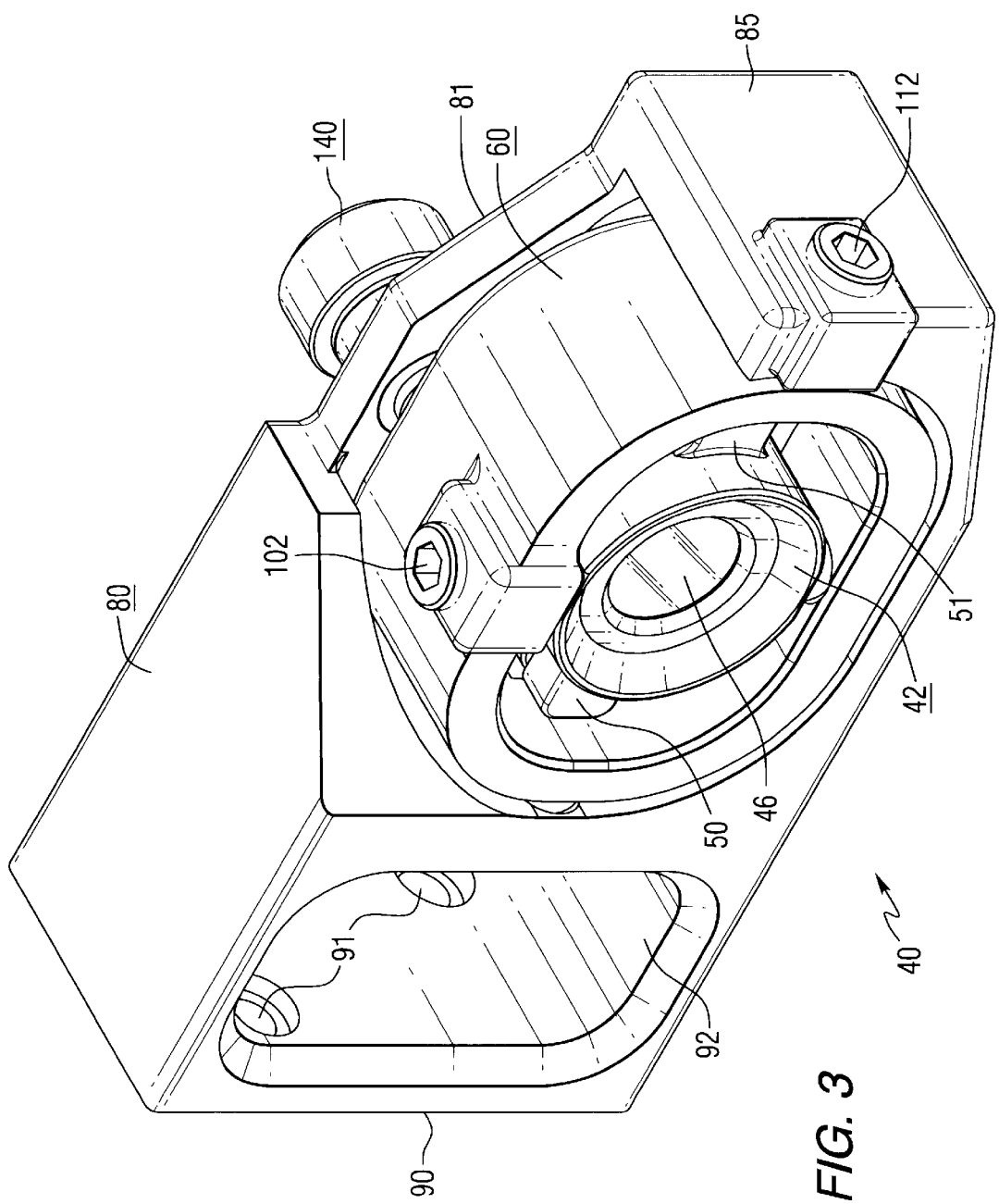
FIG. 3 is an assembled view of the gimballed mirror assembly.

The present invention is able to perform the function of beam redirection in such a LADAR environment where space is at a premium and extreme vibrations are generally encountered. FIGS. 2 and 3 illustrate, in respective exploded and assembled views, a gimballed mirror assembly 40 in accordance with one embodiment of the present invention.

Assembly 40 includes an inner gimbal unit 42, which is generally circular, and which has a front 43 and back 44, with an internal cavity 45 extending through the gimbal unit from front to back. A mirror 46 is placed in cavity 45 and is secured in position by means of a retaining ring 47. A pair of diametrically opposed projections 50 and 51 extend laterally from the body of the gimbal unit, with projection 50 extending to the right and projection 51 extending to the left.

Figure 2A:
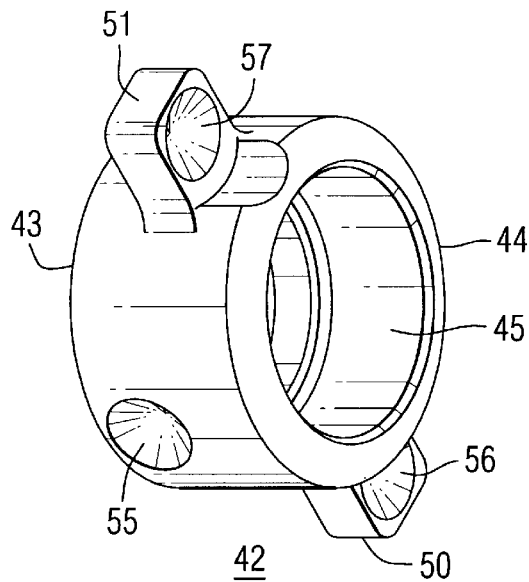
FIG. 2A is a view, from a different perspective, of the inner gimbal unit of FIG. 2.

A depression 54 is formed in the top of the gimbal unit, and is preferably conically shaped. With additional reference to FIG. 2A, a similar conical depression 55 is positioned in the bottom of the gimbal unit 42, diametrically opposed to conical depression 54 in the top. Additionally, it is seen that the backs of the projections 50 and 51 are provided with respective conical depressions 56 and 57.

Assembly 40 also includes an outer gimbal unit 60 having a back 61 and a peripheral wall 62 defining an internal cavity 63, into which the inner gimbal unit 42 is placed. The peripheral wall 62 is generally rectangular with rounded corners, to save weight, and includes a top portion 64, a bottom portion 65 and right and left side portions 66 and 67. A threaded aperture 70 extends completely through the top portion 64 and is vertically aligned with a conical depression 71 formed in the inner surface of bottom portion 65. Each side portion 66 and 67 has a respective conical depression 72 and 73 (73 not seen in FIG. 2), formed in the outer surfaces of the sides 66 and 67, with these two conical depressions 72 and 73 being directly opposed.

Figure 2B:
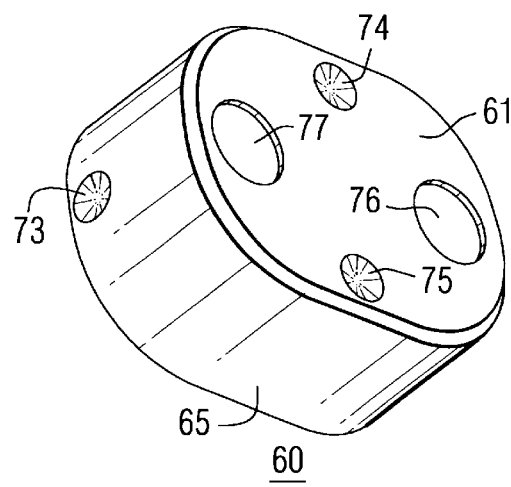
FIG. 2B is a view, from a different perspective, of the outer gimbal unit of FIG. 2.

As best seen in FIG. 2B, the back 61 of outer gimbal unit 60 includes conical depressions 74 and 75, vertically aligned, and two apertures 76 and 77, horizontally aligned. FIG. 2B also shows the conical depression 73.

A housing 80 of the gimballed mirror assembly 40 includes an apertured back 81 and side portions 82 and 83 defining a cavity 84 for receiving the outer gimbal unit 60. A threaded aperture 85 extends completely through the side portion 83 and is horizontally aligned with a conical depression 86 (86 not seen in FIG. 2) in side portion 82. The housing 80 additionally includes a mounting section 90 having mounting holes 91 and an open passageway 92 for gaining access to the mounting holes.

Figure 2C:
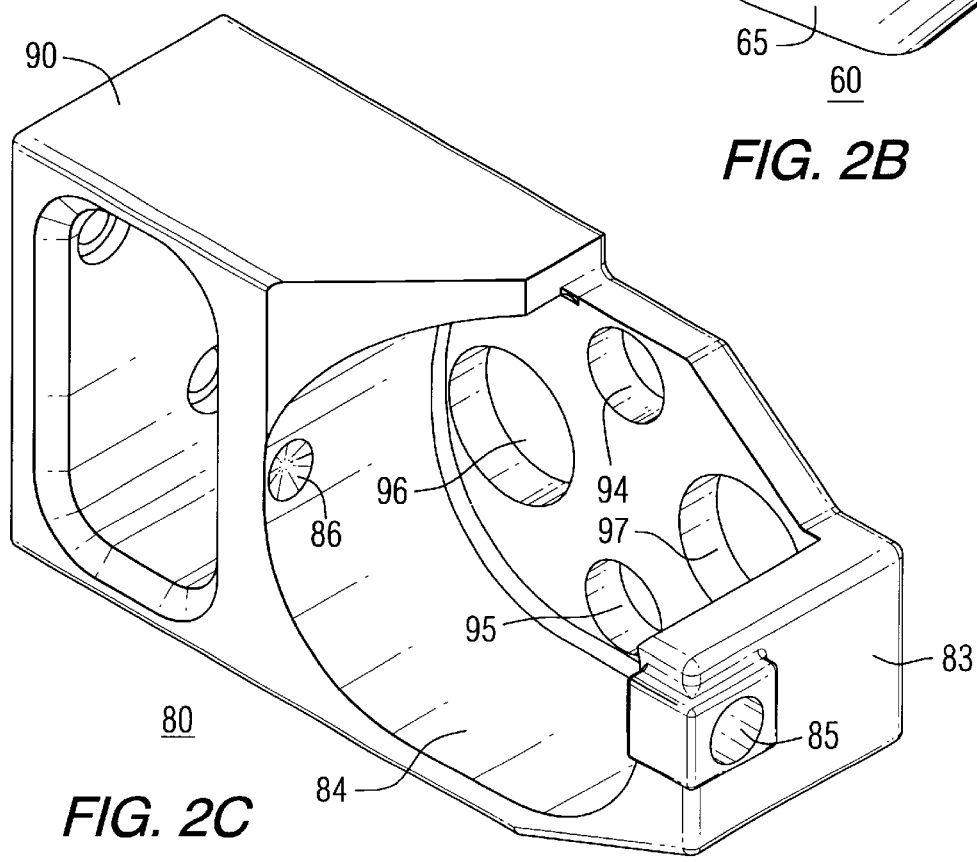
FIG. 2C is a view, from a different perspective, of the housing of FIG. 2.

As best seen in the view of FIG. 2C, the back 81 of housing 80 includes vertically aligned apertures 94 and 95, as well as horizontally aligned apertures 96 and 97. FIG. 2C also shows the conical depression 86.

Figure 4:
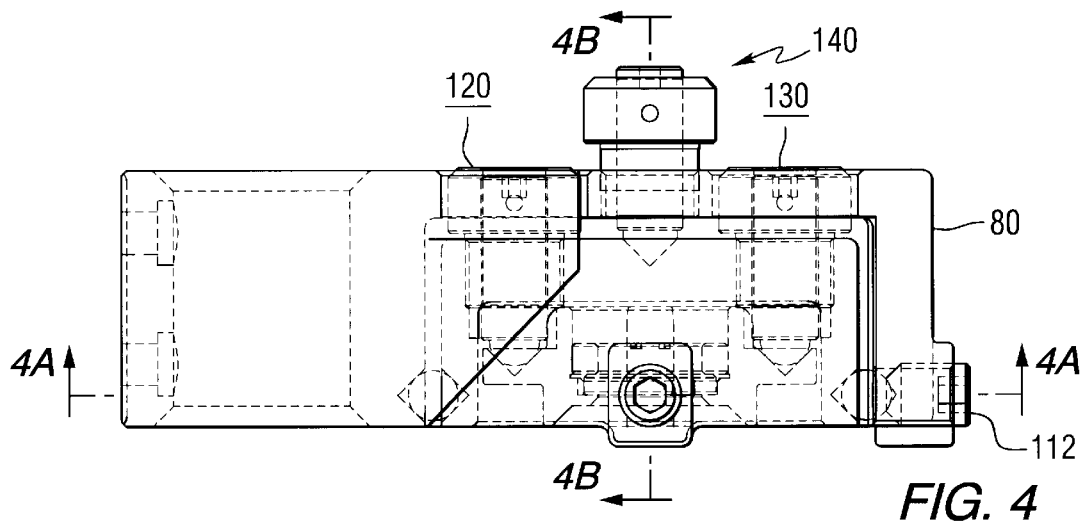
FIG. 4 is a plan view of the gimballed mirror assembly.
Figure 4A:
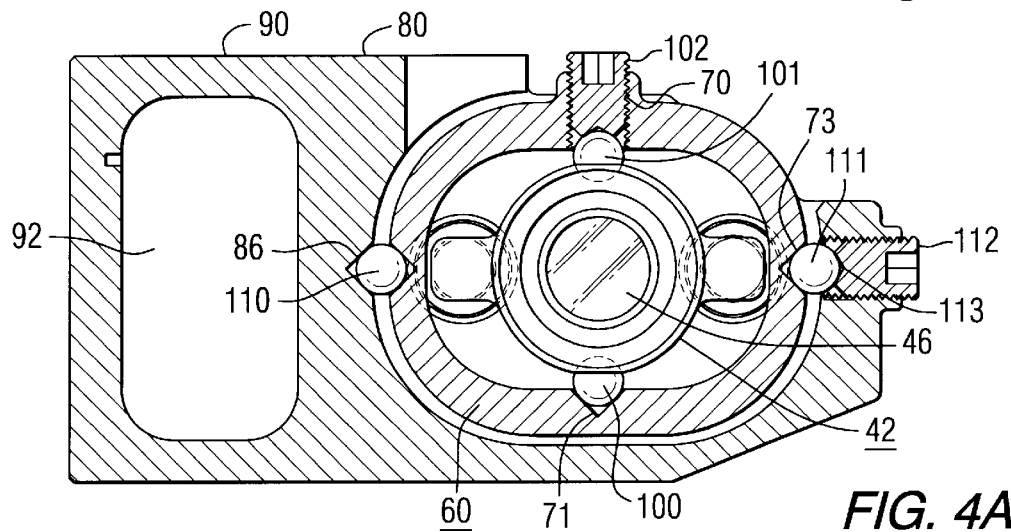
FIG. 4A is a view along the line 4A—4A of FIG. 4.
Figure 4B:
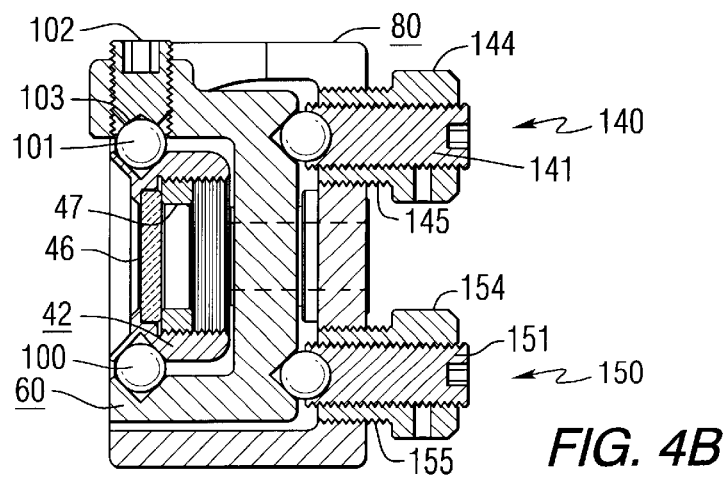
FIG. 4B is a view along the line 4B—4B of FIG. 4.

The assembly of the components can best be described with additional reference to FIGS. 4, 4A and 4B. Mirror 46 and retaining ring 47 are placed within inner gimbal unit 42, and as seen in FIG. 4B, the retaining ring 47 is threaded to positively secure the mirror 46. Further, the threads of retainer ring 47 may be provided with an adhesive so that it does not vibrate loose during operation.

A first ball bearing 100 is placed within conical depression 71 in the inner surface of the bottom of outer gimbal unit 60. The inner gimbal unit 42 is inserted into the outer gimbal unit 60 such that conical depression 55 on the bottom of inner gimbal unit 42 rests upon the ball bearing 100. A second ball bearing 101 is inserted through threaded aperture 70 in the top 64 of outer gimbal unit 60 and is secured in place by means of a threaded set screw 102, having a concave conical tip portion 103 which contacts ball bearing 101. With this arrangement, and with the orientation of FIG. 4A, inner gimbal unit 42 is permitted to experience limited rotation in azimuth about a vertical axis.

Next, housing 80 may be temporarily placed on its right side and a third ball bearing 110 placed within conical depression 86 (FIG. 2C) in the inner surface of side 82. The outer gimbal unit 60 is inserted into the housing 80 such that conical depression 72 on the right side 66 of outer gimbal unit 60 rests upon the ball bearing 110. A fourth ball bearing 111 is inserted through threaded aperture 85 in the side 83 of housing 80, and is secured in place by means of a threaded set screw 112, having a concave conical tip portion 113 which contacts ball bearing 111. With this arrangement, and with the orientation of FIG. 4A, outer gimbal unit 60 is permitted to experience limited rotation in elevation about a horizontal axis.

With the inner and outer gimbal units 42 and 60 freely moveable within housing 80 around respective vertical and horizontal axes, the gimbal units may now be adjusted and secured in a particular orientation for actual use. This is accomplished by a series of adjusting screw assemblies.

More particularly, a first adjusting screw assembly 120 includes an adjusting screw 121 preferably of the type having a ball bearing 122 at the end thereof. An adjusting screw holder 123 has a knob portion 124 and a shank portion 125, which is threaded both externally and internally. Similarly, a second adjusting screw assembly 130 includes an adjusting screw 131 having a ball bearing 132 at the end thereof. An adjusting screw holder 133 has a knob portion 134 and a shank portion 135, which is threaded both externally and internally.

These two adjusting screw assemblies, 120 and 130, are threaded into respective apertures 76 and 77 in the back of outer gimbal unit 60 (FIG. 2B), and the adjusting screws 121 and 131 advanced to contact respective conical depressions 56 and 57 in the backs of projections 50 and 51. Thereafter, the inner gimbal unit 42, and therefore mirror 46, may be set to a desired azimuth angle by a push-push operation wherein one of the adjusting screws applying a force is slightly backed out while the other is advanced to compensate. This arrangement eliminates the need for any type of spring as there is always a force being applied by the pushing adjusting screw. Chatter or vibration is minimized by the application of sufficient force to eliminate any movement in the aligned component.

A third adjusting screw assembly 140 includes an adjusting screw 141 having a ball bearing 142 at the end thereof. An adjusting screw holder 143 has a knob portion 144 and a shank portion 145, which is threaded both externally and internally. A fourth adjusting screw assembly 150 includes an adjusting screw 151 having a ball bearing 152 at the end thereof. An adjusting screw holder 153 has a knob portion 154 and a shank portion 155, which is threaded both externally and internally.

These two adjusting screw assemblies, 140 and 150, are threaded into respective apertures 94 and 95 in the back of housing 80 (FIG. 2C), and the adjusting screws 141 and 151 advanced to contact respective conical depressions 74 and 75 in the back of outer gimbal unit 60. Thereafter, the outer gimbal unit 60 may be set to a desired elevation angle by the aforementioned push-push operation.

Many gimballed mirror assemblies are constructed such that the mirror rotates about axes other than on the mirror surface. This type of design can add to the cost and complexity of the assembly. In the present invention the design is such that the azimuth and elevation axes lie on the surface of the mirror. This is demonstrated in FIG. 5 which shows mirror 46 in relation to conical depressions 54, 55 and 72,73. A line drawn between the apex of conical depression 54 and the apex of conical depression 55 (on top and bottom of inner gimbal unit 42) defines the azimuth, or vertical axis V. It is seen in FIG. 5A that axis V lies on the surface 158 of mirror 46. Similarly, a line drawn between the apex of conical depression 72 and the apex of conical depression 73 (on the right and left sides of outer gimbal unit 60) defines the elevation, or horizontal axis H, also lying on the surface 158 of mirror 46, as seen in FIG. 5B.

The use of conical depressions with mating ball bearings used throughout the design of the present invention ensures that the conical surface mates with a spherical surface of the ball bearing, with the intersection defining a circular line. This design distributes mating forces evenly about the circular line which reduces internal stresses on the conical depression and reduces any potential deflections that may tend to occur during operation.

Figure 6:
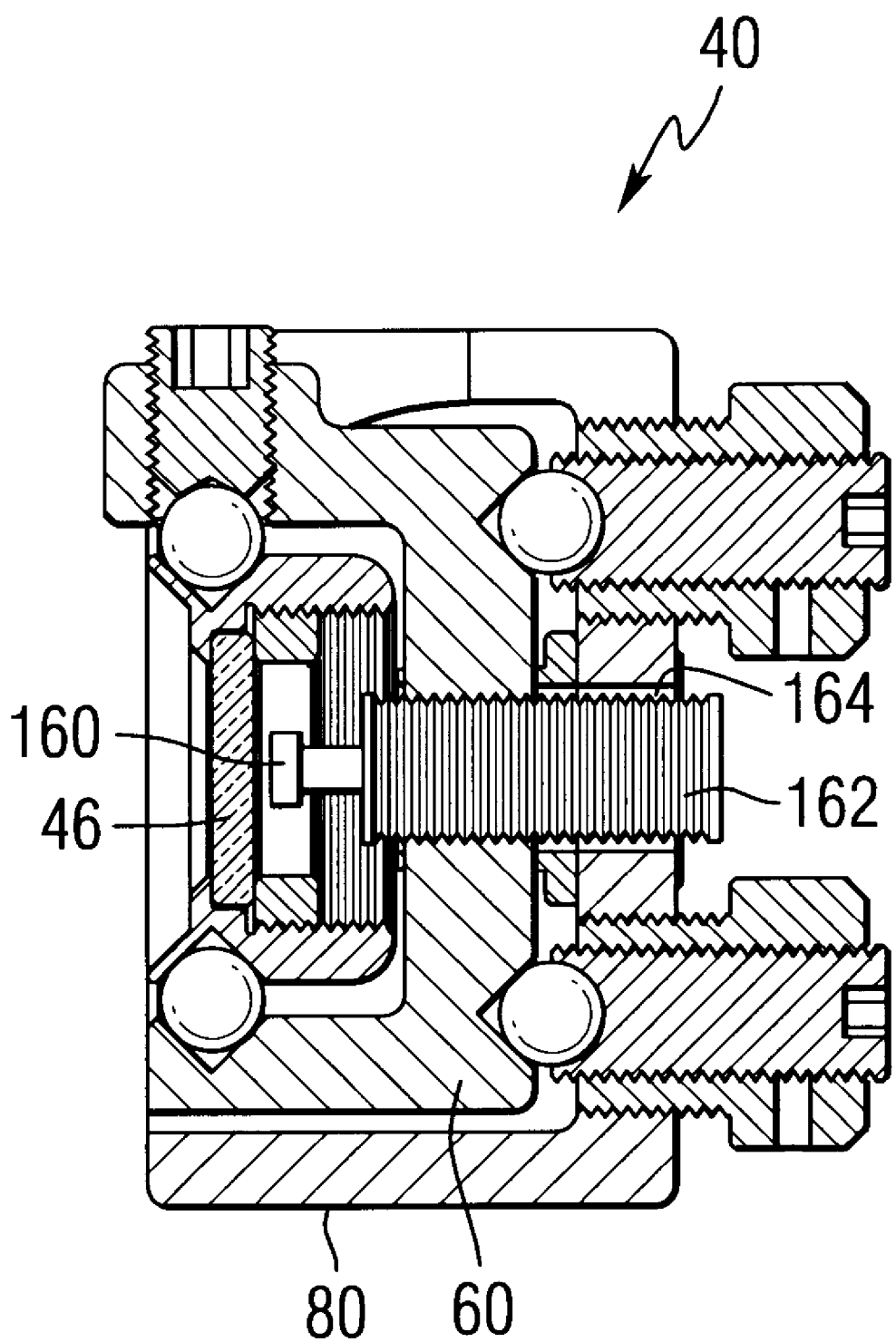
FIG. 6 illustrates an additional feature of the gimballed mirror assembly.

In dynamic environments where the gimballed mirror assembly may be subject to severe vibration it would be desirable to have an indication of such vibration in order to provide proper compensation in the detection system. To this end, and with reference to the sectioned side view of FIG. 6 (similar to FIG. 4B), the gimballed mirror assembly 40 may additionally include an accelerometer to provide an output signal indicative of encountered vibration. Accelerometer 160 is positioned just behind mirror 46 close enough to obtain an indication of mirror movement but without actually touching the mirror. An accelerometer mount 162 is threaded into an aperture in the back of the outer gimbal unit 60 and extends out the rear of housing 80 through aperture 164.

The metal components of the gimballed mirror assembly may be machined from 6061-T6 aluminum which provides for a lightweight assembly and has a strength-to-weight ratio that rivals steel. The gimballed mirror assembly may be used in environments ranging from the laboratory to vibration intensive operation such as on a jet aircraft. The gimballed mirror assembly requires no springs and can be designed to accommodate various mirror sizes without any mirror distortion.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A gimballed mirror assembly, comprising:
   a housing;
   an outer gimbal unit positioned within said housing;
   a pair of ball bearings respectively positioned on opposite sides of said outer gimbal unit between said housing and said outer gimbal unit to permit rotation of said outer gimbal unit about an axis passing through said ball bearings;
   an inner gimbal unit positioned within said outer gimbal unit;
   another pair of ball bearings respectively positioned on the top and bottom of said inner gimbal unit between said outer gimbal unit and said inner gimbal unit to permit rotation of said inner gimbal unit about an axis passing through said another pair of ball bearings;
   a first pair of adjusting screw assemblies mounted to contact and position said inner gimbal unit and to maintain it in said position;
   a second pair of adjusting screw assemblies mounted to contact and position said outer gimbal unit and to maintain it in said position; and
   a mirror carried by said inner gimbal unit, and having a reflective surface.

2. A gimballed mirror assembly according to claim 1 wherein said axes lie on the reflective surface of said mirror.

3. A gimballed mirror assembly, comprising:
   an inner gimbal unit having an internal cavity;
   a mirror secured within said cavity;
   said inner gimbal unit having opposed side projections each with a depression in a rear surface thereof, and opposed depressions in the outside surface on the top and bottom of said inner gimbal unit;
   an outer gimbal unit having a back and a peripheral wall, defining a cavity, said peripheral wall including top, bottom and side portions, with said side portions including opposed depressions in an outer surface thereof, the inner surface of said bottom portion including a depression therein and said top portion including a first aperture in vertical alignment with said depression in said bottom portion;
   said inner gimbal unit being positioned within said cavity of said outer gimbal unit with said depression in said outside surface of the bottom of said inner gimbal unit being adjacent said depression in the inner surface of said bottom portion of said outer gimbal unit and said depression in said outside surface of the top of said inner gimbal unit being adjacent said aperture in said top portion of said outer gimbal unit;
   a first ball bearing positioned in and between said depression in said outside surface of the bottom of said inner gimbal unit and said depression in said inner surface of said bottom portion of said outer gimbal unit;
   a second ball bearing positioned in and between said depression in said outside surface of the top of said inner gimbal unit and said aperture in said top portion of said outer gimbal unit;
   a first set screw positioned within said aperture and contacting said second ball bearing to apply a force thereto to maintain said inner gimbal unit within said outer gimbal unit and to permit rotation of said inner gimbal unit about a first axis which passes through said first and second ball bearings;
   a housing having a back and first and second side portions, defining a cavity, with the inner surface of said first side portion including a depression therein and said second side portion including a second aperture in horizontal alignment with said depression in said first side portion;
   said outer gimbal unit being positioned within said cavity of said housing with said depressions in said side wall portions of said outer gimbal unit being respectively adjacent said depression in said inner surface of said first side portion of said housing and said second aperture in said second side portion of said housing;
   a third ball bearing positioned in and between said depression in said side wall portion of said outer gimbal and said depression in said inner surface of said first side portion of said housing;
   a fourth ball bearing positioned in and between said depression in said side wall portion of said outer gimbal unit and said second aperture in said second side portion of said housing;
   a second set screw positioned within said second aperture and contacting said fourth ball bearing to apply a force thereto to maintain said outer gimbal unit within said housing and to permit rotation of said outer gimbal unit about a second axis which passes through said third and fourth ball bearings;
   first and second adjusting screw assemblies positioned to respectively contact said depressions in said projections of said inner gimbal unit to position said inner gimbal unit about said first axis;
   said outer gimbal unit including vertically aligned depressions in the back surface thereof;
   second and third adjusting screw assemblies positioned to respectively contact said vertically aligned depressions in the back surface of said outer gimbal unit to position said outer gimbal unit about said second axis.

4. A gimballed mirror assembly according to claim 3 wherein said cavity within said inner gimbal unit is threaded; and which includes a threaded retainer ring threaded within said cavity and abutting the periphery of said mirror to maintain it in position.

5. A gimballed mirror assembly according to claim 4 wherein said retainer ring is additionally adhesively secured to said cavity.

6. A gimballed mirror assembly according to claim 3 wherein said depressions are conical depressions.

7. A gimballed mirror assembly according to claim 3 wherein said inner gimbal unit is generally circular; and said outer gimbal unit is generally rectangular with rounded corners.

8. A gimballed mirror assembly according to claim 3 wherein the end of said first set screw which contacts said second ball bearing is conical and concave.

9. A gimballed mirror assembly according to claim 8 wherein the end of said second set screw which contacts said fourth ball bearing is conical and concave.

10. A gimballed mirror assembly according to claim 3 wherein each said adjusting screw assembly includes an adjusting screw holder having an internally threaded shaft portion and an adjusting screw threadedly engaged with said internally threaded shaft portion; and wherein said adjusting screw includes a ball bearing at the end thereof.

11. A gimballed mirror assembly according to claim 3 which includes an accelerometer positioned behind said mirror and operable to provide an output signal indicative of the vibration to which said mirror is subjected, during operation.

* * * * *